United States Patent Office 3,773,801
Patented Nov. 20, 1973

3,773,801
PROCESS FOR PREPARING 1-HYDROXY-3-METHYL ANTHRAQUINONES
Gerard Lang, Epinay-sur-Seine, France, assignor to L'Oreal, Paris, France
No Drawing. Filed Sept. 7, 1971, Ser. No. 178,422
Claims priority, application Luxembourg, Sept. 7, 1970, 61,653
Int. Cl. C09h 1/04
U.S. Cl. 260—383            7 Claims

ABSTRACT OF THE DISCLOSURE

Substituted 1-hydroxy-3-methyl anthraquinones, as for example 1,3,5-trihydroxy-3-methyl anthraquinone, are prepared by reacting a 2-halogeno naphthoquinone with a 1,1-dialkoxy-3-methyl butadiene in the presence of an inert anhydrous solvent with subsequent dealkylation according to the disclosed process. The 1-hydroxy-3-methyl anthraquinones thus produced are useful as intermediates in organic synthesis.

BACKGROUND OF THE INVENTION

The present invention relates to the preparation of substituted anthraquinones and more particularly to a process for preparing anthraquinones having a hydroxy group in the 1 position and a methyl group in the 3 position, and at one or more of positions 5, 6, 7 and 8 one or more substitutents.

A process for preparing 1,3-diethoxy anthraquinone has already been described by MacElvain et al. in J. Amer. Chem. Soc. 66, 1077 (1944) where an excess of 1,1-diethoxy ethylene is reacted with 2-bromo-1,4-naphthoquinone. Then 1,3-dihydroxy anthaquinone is obtained by subsequent de-ethylation of the 1,3-diethoxy anthraquinone. The formation of the anthraquinone ring is explained by MacElvain et al. by the following group of equations:

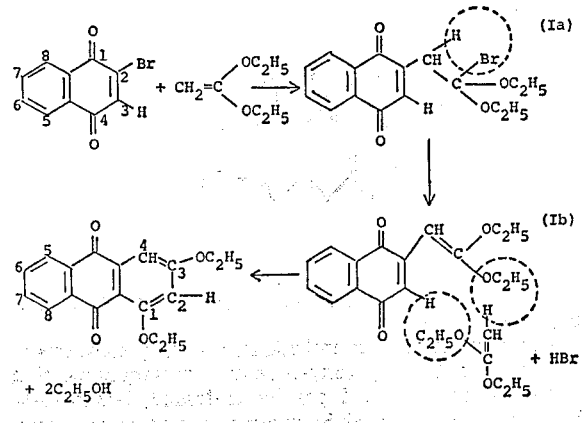

In the first stage of the reaction, identified above as (Ia) the first mole of 1,1-diethoxy ethylene, by nucleophilic attack, attaches at the 2 position of the naphthalene ring with migration of the bromine atom, producing HBr and an intermediate compound which is in turn reacted with an additional mole of 1,1-diethoxy ethylene in a second stage of the reaction, identified above as (Ib) to give 1,3-diethoxy anthraquinone by condensation with elimination of two moles of ethyl alcohol.

According to the above reaction scheme, a 2-halogeno naphthoquinone carrying a substituent R, for example, at the 7 position of the naphthoquinone ring will yield a 1,3-diethoxy anthraquinone carrying the R substituent on the number 6 position of the anthraquinone ring. Thus, to produce a 1,3-diethoxy anthraquinone having a substituent in the 6 position it is necessary, according to the process of MacElvain, to begin with a 2-halogeno naphthoquinone having the same substituent on the 7 position of the naphthoquinone ring; but this to the extent that the above reaction scheme of MacElvain, it is still true for such substituted compounds, having no symmetry on benzenic part of the ring.

It is also apparent that when using a 1,1-dialkoxy-3-methyl butadiene, only one mole would be required, as compared with 2 moles of 1,1-diethoxy ethylene according to MacElvain, and that the attachment to the quinoline ring would occur in the 2 position occupied by the halogen atom.

DETAILED DESCRIPTION OF THE INVENTION

According to the present invention, a 2-halogen substituted naphthoquinone is reacted with a 1,1-dialkoxy-3-methyl butadiene to produce a 1-alkoxy-3-methyl anthaquinone which is later dealkylated and a 1-hydroxy-3-methyl anthraquinone is recovered. The present invention is particularly advantageous in that a 2-halogeno naphthoquinone carrying the same substituents placed in the same position relative to the halogen atom in the 2 position is used which results in the same substituents on the 5, 6, 7 and 8 positions of the resulting 1-hydroxy-3-methyl anthraquinone.

More particularly, it has now been discovered that 1-hydroxy-3-methyl anthraquinones having the formula:

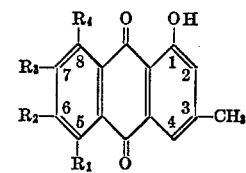

wherein $R_1$ and $R_4$ are independently hydrogen, hydroxy or halogen, $R_2$ and $R_3$ are independently hydrogen, hydroxy, alkyl having 1 to 4 carbon atoms or alkoxy having 1 to 4 carbon atoms, are prepared by reacting a 2-halogeno naphthoquinone having the formula:

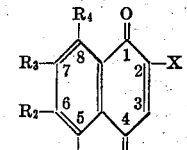

wherein X is halogen and $R_1$, $R_2$, $R_3$ and $R_4$ have the significance given above, at a temperature of about 20° C. to about 150° C. in the presence of an inert anhydrous solvent, with a molar excess of 1,1-dialkoxy-3-methyl butadiene of the formula:

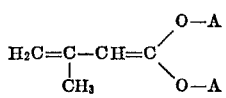

wherein A is alkyl having 1 to 4 carbon atoms, to produce 1-alkoxy-3-methyl anthraquinone, which is subsequently dealkylated and the 1-hydroxy-3-methyl anthraquinone is recovered from the reaction mixture. In the dealkylation when $R_2$ or $R_3$ is alkoxy, as defined above, the substituent is also dealkylated to hydroxy. Similarly, when $R_1$ is halogen, the substituent is converted to hydrogen in the dealkylation reaction.

The reaction is conducted according to the following reaction scheme:

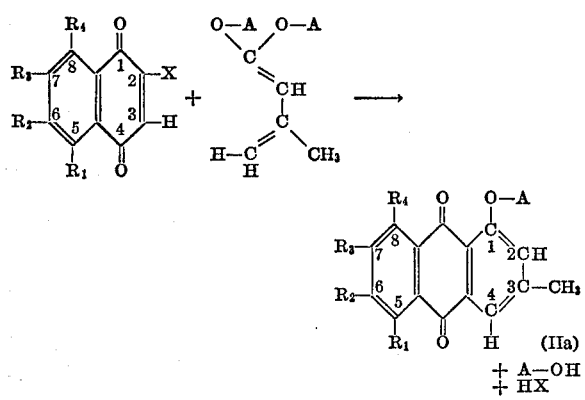

Attachment of the 1,1 - dialkoxy-3-methyl butadiene is performed, by the unsubstituted end carbon atom of this compound, at position 3 of the naphthoquinone ring, that is, on the unsubstituted carbon atom adjacent to the one carrying the halogen atom. This reaction is performed with elimination of a molecule of hydroxalic acid, an alkanol containing 1 to 4 carbon atoms. The product obtained is then dealkylated, for example, by treatment in the presence of $AlCl_3$, to produce the 1-hydroxy-3-methyl anthraquinone.

In particular, if it is desired to obtain a 1-hydroxy-3-methyl anthraquinone carrying a substituent at position 6 of the anthraquinone ring, there is used as the starting compound a 2-halogeno naphthoquinone carrying the desired substituent at position 6 of the naphthoquinone ring and not at position 7 of this ring, as could have been provided by the mechanism disclosed by MacElvain for preparing 1,3-diethoxy anthraquinone.

The process of preparing 1-hydroxy-3-methyl anthraquinones according to the invention therefore comprises the following stages:

(1) Cyclization of a molecule of 1,1-dialkoxy-3-methyl butadiene on a molecule of 2-halogeno naphthoquinone having the formula indicated above, to obtain the corresponding 1-alkoxy-3-methyl anthraquinone;

(2) Dealkylation of this 1 - alkoxy-3-methyl anthraquinone to obtain the corresponding 1-hydroxy-3-methyl anthraquinone, this dealkylation also being able to be carried out simultaneously on other substituents carried by the initial naphthoquinone.

During the cyclizing stage of the process of the present invention, different reactants and reaction conditions are used.

For example, as the 1,1-dialkoxy-3-methyl butadiene there may be used any lower alkoxy-3-methyl butadiene having 1 to 4 carbon atoms such as 1,1-dimethoxy-3-methyl butadiene, 1,1-diethoxy-3-methyl butadiene, 1,1-dipropoxy-3-methyl butadiene, and 1,1-dibutoxy-3-methyl butadiene thereof. The 1,1-dialkoxy-3-methyl butadiene is generally present in the reaction in a molar equivalent amount to the halogen-substituted naphthoquinone, although different amounts may be applied. As the halogen there may be used fluorine, chlorine and bromine.

The reaction is preferably conducted, for reasons of convenience and economy, at atmospheric pressure, although higher and lower pressures may be applied. The reaction solvent is any suitable inert anhydrous solvent that remains liquid within the temperature range of 20° C. to 150° C. and does not react with the reactants to give undesirable side products. Reaction solvents include by way of example, anhydrous benzene, toluene, xylene, and ligroin.

Mixtures of two or more of the above solvents may also be used. Solvents for recrystallization of the 1-hydroxy-3-methyl anthraquinones produced according to the invention will be readily apparent and include, by way of example, cyclohexane, benzene, toluene, xylene and the like, as well as mixtures of two or more solvents.

The dealkylation of the 1-alkoxy-3-methyl anthraquinone to obtain the corresponding 1 - hydroxy-3-methyl anthraquinone may be accomplished by treating the dialkoxy compound with a molar excess of aluminum chloride and with stirring at a temperature of about 50° C. to about 120° C. in the presence of an inert anhydrous solvent such as nitrobenzene or the like. When the reaction is complete, the 1-hydroxy-3-methyl anthraquinone is separated and purified by recrystallization, such as pouring the reaction mixture into a mixture of ice and water, concentrating the mother liquors, separating the crystals thus formed and recrystallizing the crystals in a suitable solvent.

In some instances substituents on the 1-alkoxy compound are charged in the dealkylation reaction. For instance, when either $R_2$ or $R_3$ or both are alkoxy, this group is also dealkylated along with the 1-alkoxy group to the hydroxy group. Similarly, when either $R_1$ is halogen, this group is converted to a hydrogen atom during the dealkylation reaction. Dealkylation treatment can, further, be followed, when the quinone structure has disappeared, by a suitable treatment reestablishing this quinone structure. That is the case of Example 3, in which 1 - ethoxy-3-methyl-5-chloro-8-hydroxy anthraquinone reacted with red prosphorus and hydriodic acid gives

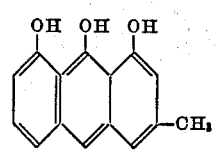

and after oxidation 1,8-dihydroxy - 3 - methyl anthraquinone.

According to another embodiment of the present invention when a 1,8-dihydroxy-3-methyl anthraquinone that is unsubstituted in the 5 position is desired, 2-halogen-5-halogen-8-hydroxy naphthoquinone is used as the starting reactant and, at the completion of the cyclization reaction the correspondingly 1-alkoxy-3-methyl-5-halogeno-8-hydroxy anthraquinone is obtained. The alkoxy compound is then treated with acetic acid, red phosphorus and hydriodic acid at a temperature of about 80° C. to about 150° C. in an inert solvent to form the corresponding anthranol which is subsequently oxidized with chromic oxide at a temperature of about 40° C. to about 100° C. in an inert solvent. The 1,8-dihydroxy-3-methyl anthraquinone thus produced is recovered and preferably recrystallized.

The above reaction may be described by the following reaction scheme:

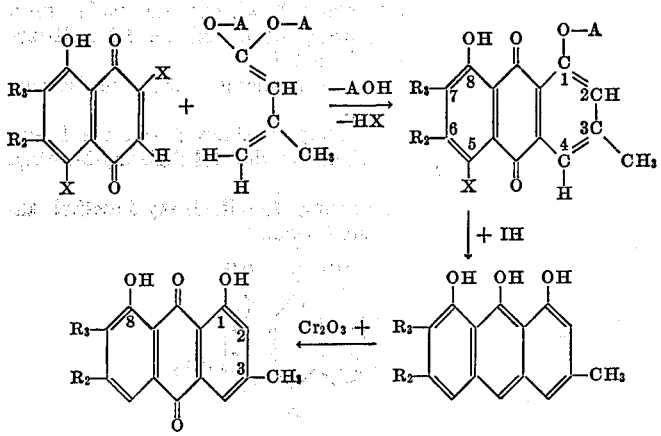

The present invention has advantage over methods previously known in that to prepare 1-hydroxy-3-methyl anthraquinones having $R_1$, $R_2$, and $R_4$ substituents as defined above, one merely selects the appropriate 2-halogeno naphthoquinone having the same substituents in the same position relative to the halogen atom in the 2 position as the desired anthraquinone and reacts with an equal molar quantity of 1,1-dialkoxy-3-methyl butadiene under the appropriate conditions. Compounds are readily prepared having substituents only at the desired positions. Also, several natural quinones of the above structure are prepared directly, conveniently and in high yield.

The compounds produced by the process of the present invention have wide application and are useful as intermediates in organic synthesis.

Other advantages of the invention will be apparent from the following examples which illustrate preferred embodiments of the invention. Unless otherwise indicated, all parts and percentages are by weight and temperatures are in degrees centigrade.

EXAMPLE 1.—PREPARATION OF 1,5,8-TRIHYDROXY-3-METHYL ANTHRAQUINONE (A) Condensation: Preparation of 1-ethoxy-5,8-dihydroxy-3-methyl anthraquinone In a flask equipped with a dropping funnel, a stirrer and a reflux refrigerant, a mixture of 2-chloro-5,8-dihydroxy-1,4-naphthoquinone (0.01 mole) and 1,1-diethoxy-3-methyl butadiene (0.01 mole) in anhydrous benzene (10 ml.) was heated at 80° C. with reflux for 12 hours. The naphthoquinone reactant was prepared according to the method of P. C. Arora et P. Brassard Can. J. Chem. 45, 67 (1967). After cooling of the reaction mixture, a small amount of petroleum ether was added to it and the precipitate obtained was separated by drying and recrystallizing in benzene. Thus, 1-ethoxy-3-methyl-5,8-dihydroxy anthraquinone was obtained in the form of red needles which after recrystallization in petroleum ether had a melting point of 186–187°. The yield was 80%.

(B) Dealkylation: Preparation of 1,5,8-trihydroxy-3-methyl anthraquinone

While stirring, 1 part of 1-ethoxy-3-methyl-5,8-dihydroxy anthraquinone, obtained in (A), was added with stirring to a solution containing nitrobenzene (40 parts) and aluminum chloride (10 parts). After 5 hours of stirring at a temperature of 80° C., the entire mixture was poured in a mixture of water and ice (500 parts). The nitrobenzene was removed by a petroleum ether extraction and the reaction was completed by heating the remaining mother liquors at a temperature of 80° C. After cooling of the reaction mixture the crystals were separated by draining and recrystallizing in pyridine to obtain 1,5,8-trihydroxy-3-methyl anthraquinone (or helminthosporin) in the form of brownish orange plates having a melting point of 226–227°. The established melting point is 226–227° according to H. Raistrick, R. Robinson and A. R. Todd, J. Chem. Soc. 1933, 488.

The triacetate prepared from the helminthosporin obtained above was in the form of yellow needles which after recrystallization in ethyl alcohol had a melting point of 223°. The known melting point is 224°, according to the above reference.

EXAMPLE 2.—PREPARATION OF 3-METHYL-1,5,6,8-TETRAHYROXY ANTHRAQUINONE

As the starting compound 2-chloro-5,8-hydroxy-6-methoxy anthraquinone prepared according to the method of P. C. Arora et P. Brassard Can. J. Chem. 45, 67 (1967), was used which was condensed with 1,1-diethoxy-3-methyl butadiene under the same conditions as in part A of Example 1 but using a different reactant to obtain 1-ethoxy-3-methyl-5,8-hydroxy-6-methoxy anthraquinone. Then dealkylation of the 1-ethoxy compound was performed, again under the same conditions of Example 1, to obtain 3-methyl-1,5,6,8-tetrahydroxy anthraquinone in the form of a red product having a melting point greater than 300.

EXAMPLE 3.—PREPARATION OF 1,8-DIHYDROXY-3-METHYL ANTHRAQUINONE

As the starting product 2-bromo-5-chloro-8-hydroxy naphthoquinone was used, obtained by the process of R. H. Thomson, J. Org. Chem. 13, 377 (1948).

1,1-diethoxy-3-methyl butadiene (0.01 mole) was reacted with 2-bromo-5-chloro-8-hydroxy naphthoquinone in the presence of anhydrous benzene under the same conditions as in part A of Example 1. After separation of the crystals formed and recrystallization in a mixture of benzene and petroleum ether, 1-ethoxy-3-methyl-5-chloro-8-hydroxy anthraquinone was obtained in the form of yellow needles with a yield of 75%, the results of analysis being the following:

Melting point: 212°
Analysis $C_{17}H_{12}ClO_4$
Calculated (percent): C, 64.66; H, 3.84.
Found (percent): C, 64.32; H, 3.95.

Hydriodic acid treatment: In a flask equipped with a dropping funnel, a stirrer, a reflux coolant and containing a mixture of 1-ethoxy-3-methyl-5-chloro-8-hydroxy anthraquinone (1 part), acetic acid (20 parts) and red phosphorus (1 part), hydriodic acid (4 parts) with a density of 1.57 was added.

The reaction mixture was heated to 40° with reflux for 5 hours and after cooling to 20° the reaction mixture was poured into water and ice (200 parts). The reaction mixture was allowed to stand for several hours, the precipitate formed was separated by draining and drying in air. The crystalline mass was extracted with chloroform and the extracts thus obtained were evaporated until dry.

Oxidation treatment: Oxidation of the residue obtained from the above hydriodic acid treatment was performed by an equal weight of chromic anhydride contained in acetic acid (50 parts) at a temperature of 60° for 30 minutes. A dark brown solution was obtained to which water (500 parts) was added which was subsequently extracted with chloroform. After concentration and cooling of the solution, the crystals were separated by filtering and then recrystallized in ethyl alcohol to obtain 1,8-dihydroxy-3-methyl anthraquinone, or chrysophanic acid, in the form of dark yellow crystals having a melting point of 192–193°. The established melting point is 196° according to R. Eder and C. Widmer, Helv. Chem. Acta 5 (1922) 3.

The diacetate prepared from the crystals thus obtained had a melting point of 206–208°. The known melting point is 208° according to O. Fisher, F. Falco and H. Gross, J. Prakt. Chem. 83 (1911) 208.

I claim:

1. Process for preparing 1-hydroxy-3-methyl anthraquinones having the formula:

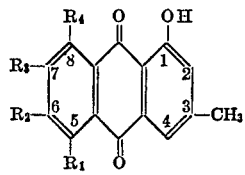

wherein $R_1$ and $R_4$ are independently selected from the group consisting of hydrogen, hydroxy and halogen, and $R_2$ and $R_3$ are independently selected from the group consisting of hydrogen, hydroxy, alkyl having 1 to 4 carbon atoms, and alkoxy having from 1 to 4 carbon atoms, comprising:

(a) reacting a 2-halogen naphthoquinone having the formula:

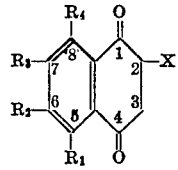

wherein X is halogen and $R_1$, $R_2$, $R_3$ and $R_4$ have the significance given above, at a temperature of about 20° C. to about 150° C. in the presence of an inert anhydrous solvent, with a 1,1-dialkoxy-3-methyl butadiene of the formula:

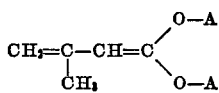

wherein A is alkyl having 1 to 4 carbon atoms, to produce 1-alkoxy-3-methyl anthraquinone, (b) dealkylating the resulting 1-alkoxy-3-methyl anthraquinone, and (c) recovering said 1-hydroxy-3-methyl anthraquinone.

2. The process of claim 1 wherein the dealkylation of step (b) comprises treating the 1-alkoxy-3-methyl anthraquinone with a molar excess of aluminum chloride at a temperature of about 50° C. to about 120° C. in the presence of an inert solvent.

3. The process of claim 1 wherein the dealkylation of step (b) comprises:

(i) treating the 1-alkoxy-3-methyl anthraquinone in the presence of red phosphorus and hydriodic acid at a temperature of about 80° C. to about 150° C. in an inert solvent to form the corresponding anthranol, and (ii) oxidizing said anthranol with chromic anhydride at a temperature of about 80° C. to about 150° C. in an inert solvent.

4. The process of claim 1 wherein the molar ratio of the 2-halogen naphthoquinone and the 1,1-dialkoxy-3-methyl butadiene is about 1:1.

5. The process of claim 1 wherein anhydrous benzene is the solvent of step (a).

6. The process according to claim 1 wherein 1,1-diethoxy-3-methyl butadiene is the 1,1-dialkoxy-3-methyl butadiene.

7. Process for preparing 1,8-dihydroxy-3-methyl anthraquinones having the formula:

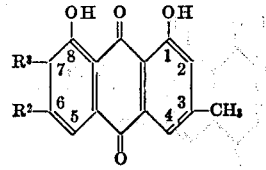

wherein $R_2$ and $R_3$ are independently selected from the group consisting of hydrogen, hydroxy, alkyl having 1 to 4 carbon atoms, and alkoxy having from 1 to 4 carbon atoms, comprising:

(a) reacting a 2,5-dihalogen-8-hydroxy naphthoquinone having the formula:

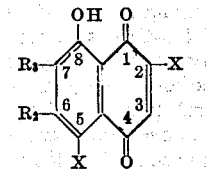

wherein X is independently halogen and $R_2$ and $R_3$ have the significance given above, at a temperature of about 20° C. to about 150° C. in the presence of an inert anhydrous solvent, with a molar excess of 1,1-dialkoxy-3-methyl butadiene of the formula:

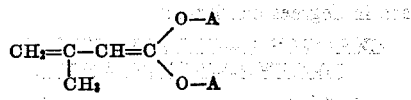

wherein A is alkyl having 1 to 4 carbon atoms, to produce 1-alkoxy-3-methyl-5-halogen-8-hydroxy anthraquinone, (b) dealkylating the resulting 1-alkoxy-3-methyl-5-halogen-8-hydroxy anthraquinone by (i) treating the 1-alkoxy-3-methyl-5-halogen-8-hydroxy anthraquinone in the presence of red phosphorus, acetic acid and hydriodic acid at a temperature of about 80° C. to about 150° C. in an inert solvent to form the corresponding anthranol, and (ii) oxidizing said anthranol with chromic oxide at a temperature of about 40° C. to about 100° C. in an inert solvent, and (c) recovering said 1,8-dihydroxy-3-methyl anthraquinone.

References Cited

Butz et al.: Organic Reactions, vol. V, p. 147 (1949).
Houher: Das Anthracen und die Anthrachinone, pp. 372–383 (1929).

LORRAINE A. WEINBERGER, Primary Examiner

R. GERSTL, Assistant Examiner

U.S. Cl. X.R.

260—351